US008270045B2

(12) United States Patent
Iwata

(10) Patent No.: US 8,270,045 B2
(45) Date of Patent: Sep. 18, 2012

(54) CABLING APPARATUS, IMAGE READING APPARATUS, AND IMAGE FORMING APPARATUS

(75) Inventor: Hyoe Iwata, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 12/394,633

(22) Filed: Feb. 27, 2009

(65) Prior Publication Data

US 2009/0225375 A1 Sep. 10, 2009

(30) Foreign Application Priority Data

Mar. 7, 2008 (JP) ................................ 2008-058499

(51) Int. Cl.
*H04N 1/04* (2006.01)
*E05F 1/08* (2006.01)
*G03G 15/00* (2006.01)

(52) U.S. Cl. ........ 358/497; 358/474; 399/362; 399/380; 16/21

(58) Field of Classification Search .................. 358/474; 16/286, 289, 290; 399/362, 380
See application file for complete search history.

(56) References Cited

U.S. PATENT DOCUMENTS 6,499,189 B2 * 12/2002 Kondo et al. ................... 16/289
6,909,048 B2 6/2005 Yamanaka et al.
7,418,766 B2 * 9/2008 Nelson et al. ................... 16/239
7,574,942 B2 * 8/2009 Miyazaki ..................... 74/500.5
2004/0238199 A1 * 12/2004 Yamanaka et al. ........... 174/68.1
2007/0047024 A1 3/2007 Onose et al.

FOREIGN PATENT DOCUMENTS

CN 1573589 A 2/2005
JP 11-038716 A 2/1999
JP 3430868 B2 7/2003
JP 2003-241443 8/2003
JP 2005-141038 A 6/2005
JP 4530646 B2 8/2010

OTHER PUBLICATIONS

Office Action—Appln. No. 200910007976.0—State Intellectual Property Office of the People's Republic of China, Feb. 16, 2011.
Office Action—Japanese Patent Appln. No. 2008-058499, Japanese Patent Office, Jul. 17, 2012.

* cited by examiner

*Primary Examiner* — Akwasi M Sarpong
(74) *Attorney, Agent, or Firm* — Fitzpatrick, Cella, Harper & Scinto

(57) ABSTRACT

There is provided a cabling apparatus comprising, a cable connecting a first unit and a second unit which turns around a turning axial line of a hinge portion with respect to the first unit via the hinge portion, a cable guide portion, which guides the cable, in which the cable guide portion is turnably attached to the second unit on one end side of the cable guide portion and is connected to the first unit on the other end side of the cable guide portion, wherein a turning axial line of the guide portion with respect to the second unit and a turning axial line of the hinge portion accord with each other.

12 Claims, 8 Drawing Sheets

CABLING APPARATUS, IMAGE READING APPARATUS, AND IMAGE FORMING APPARATUS

BACKGROUND OF THE INVENTION

1. Field of the Invention

The present invention relates to a cable guide, an image reading apparatus, and an image forming apparatus and, more particular, to the configuration of a cable guide portion for guiding a cable, the cable connecting an original conveying apparatus and an image reading apparatus body to each other.

2. Description of the Related Art

There has been known an image reading apparatus or an image forming apparatus such as an electrophotographic printer or an ink-jet printer having an image reading apparatus in the prior art, provided with an original conveying apparatus which is openably disposed with respect to an image reading apparatus body. In reading an image formed on a sheet, an automatic original feeding apparatus which is an example of an original conveying apparatus first conveys an original or a sheet onto an original base plate glass. Next, an image reading unit disposed under the original base plate glass is moved in a read direction, thereby reading the image recorded on the original.

Otherwise, in the case where a user reads an image of an original placed on an original base plate glass, the original is placed on the original base plate glass, and then, the original is pressed by an automatic original feeding apparatus, to be thus securely mounted on the original base plate glass. In this state, an image reading unit is moved in a read direction, thereby reading the image recorded on the original.

Here, the automatic original feeding apparatus is openably connected onto a back side of an image reading apparatus body via a hinge portion. In the case where, for example, the original is placed on the original base plate glass, an automatic original feeding apparatus 100 is turned upward via a hinge portion 101, and then, an original D is placed on an original base plate glass 103 attached onto an image reading apparatus body 102, as illustrated in FIG. 8A. Next, the automatic original feeding apparatus 100 is closed to press the original D placed on the original base plate glass, as illustrated in FIG. 8B. Thereafter, an image recorded on the original D is read by an image reading unit, not illustrated.

The hinge portion 101 is provided with a base 29 disposed in the image reading apparatus body 102, a movable part 30 to be secured to the automatic original feeding apparatus 100, and a relay arm 31 for turnably tightening the movable part 30 with respect to the base 29 via a pin 32. Here, the movable part 30 is turnably held by the relay arm 31 via another pin 33.

When the automatic original feeding apparatus 100 is turned upward, the movable part 30 and the relay arm 31 cannot be moved relatively to each other, such that the automatic original feeding apparatus 100 is turned counterclockwise with respect to the image reading apparatus body 102 on the pin 32 integrally with the relay arm 31, as illustrated in FIG. 8A.

In reading image information on a thick original such as a book, a thick original D1 such as a book is set on a platen glass, and then, the automatic original feeding apparatus 100 is closed to press the thick original D1, as illustrated in FIG. 8C.

Here, in the case where the thick original D1 is pressed, the automatic original feeding apparatus 100 is counterclockwise turned integrally with the relay arm 31, as illustrated in FIG. 8A, and then, is turned around the pin 33 clockwise with respect to the relay arm 31 integrally with the movable part 30. As a consequence, the automatic original feeding apparatus 100 is positioned at an angle substantially parallel to and above the image reading apparatus body 102, thereby uniformly pressing the thick original D1.

In FIGS. 8A to 8C, a cable 120 is adapted to transmit a signal or supply power between the automatic original feeding apparatus 100 and the image reading apparatus body 102. The cable 120 is disposed at back surfaces of the automatic original feeding apparatus 100 and the image reading apparatus body 102, and further, is connected at one end thereof to a control board, not illustrated, housed inside of the image reading apparatus body, while at the other end thereof to a relay board housed inside of the automatic original feeding apparatus.

As described above, since the automatic original feeding apparatus 100 is not only turned but also elevated with respect to the image reading apparatus body 102, the cable 120 needs to have an extra length as great as not to extend. Therefore, the automatic original feeding apparatus 100 and the image reading apparatus body 102 are connected to each other via the slightly long cable 120.

Here, if the cable 120 is excessively long, the cable 120 sags. In the case where the cable 120 is exposed to the outside of the image reading apparatus body 102, the outer appearance is not good if the cable 120 sags, although the cable 120 is located at the back surface.

Otherwise, in opening or closing the automatic original feeding apparatus 100, the cable 120 may be possibly caught, and then, may be damaged. Therefore, a cable clamp is fitted, or the orientation of a connector is changed. In taking such measurements, there are many restrictions from the viewpoint of board arrangement or wiring. Moreover, in the case where the cable 120 is exposed to the outside, it is necessary to use a cable having a high shieldability, which hardly suffers a noise influence. In other words, an expensive cable must be used.

In view of this, in order to eliminate such an inconvenience, a flat cable is used as the cable, and further, cable guides are disposed in the image reading apparatus body 102 and the automatic original feeding apparatus 100 (see Japanese Patent Application Laid-open No. 2003-241443). Here, the cable guide is formed into a tube shape. For its use, the flat cable is slidably inserted and held in the cable guide.

The flat cable slidably inserted into and held in the cable guide sags in such a manner as not to receive an excessive tension inside of the automatic original feeding apparatus when the automatic original feeding apparatus is closed. In contrast, when the automatic original feeding apparatus 100 is turned, the flat cable is bent. When the automatic original feeding apparatus is moved upward to read the image of the thick original, the flat cable is designed to be vertically slid.

In the image reading apparatus provided with the above-described cable guide in the prior art, the automatic original feeding apparatus is turned and elevated not independently but sequentially. For example, in reading the thick original, the automatic original feeding apparatus 100 is opened, and then, the thick original D1 is placed on the platen glass. Thereafter, the automatic original feeding apparatus 100 is closed. At this time, the automatic original feeding apparatus 100 is shifted from the state illustrated in FIG. 8A to the state illustrated in FIG. 8C.

In this state, the automatic original feeding apparatus 100 is sequentially turned and elevated. The turn and elevation of the automatic original feeding apparatus 100 enable the cable to be bent and slid in sequence.

In the case where the tube-like cable guide in the prior art sags, the cable cannot be smoothly slid while being bent.

Otherwise, if the automatic original feeding apparatus is turned with the sag, the cable may be possibly damaged in contact with an inner wall surface of the automatic original feeding apparatus.

The present invention has been made in view of such circumstances and provides a cable guide which can be held without any damage, an image reading apparatus, and an image forming apparatus.

SUMMARY OF THE INVENTION

There is provided a cabling apparatus comprising: a cable connecting a first unit and a second unit which turns around a turning axial line of a hinge portion with respect to the first unit via the hinge portion; a cable guide portion, which guides the cable, in which the cable guide portion is turnably attached to the second unit on one end side of the cable guide portion and is connected to the first unit on the other end side of the cable guide portion, wherein a turning axial line of the guide portion with respect to the second unit and a turning axial line of the hinge portion accord with each other.

According to the present invention, it is possible to reduce a damage on the cable caused by a turn of the second unit with respect to the first unit.

Further features of the present invention will become apparent from the following description of exemplary embodiments with reference to the attached drawings.

DESCRIPTION OF THE EMBODIMENTS

An exemplary embodiment carrying out the present invention will be described in detail below with reference to the attached drawings.

Figure 1:
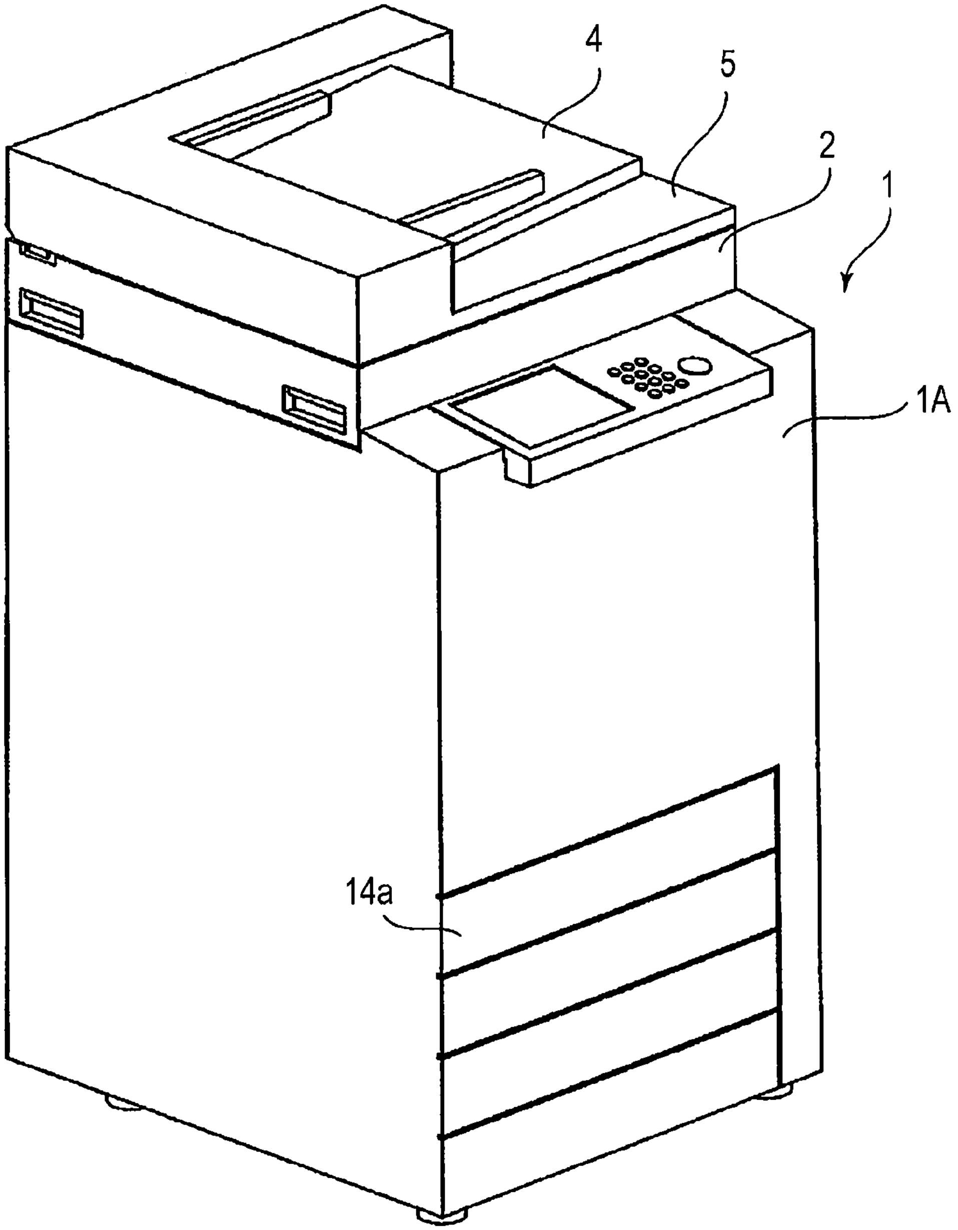
FIG. 1 is a perspective view illustrating the outer appearance of an image forming apparatus provided with an image reading apparatus according to an embodiment of the present invention.
Figure 2:
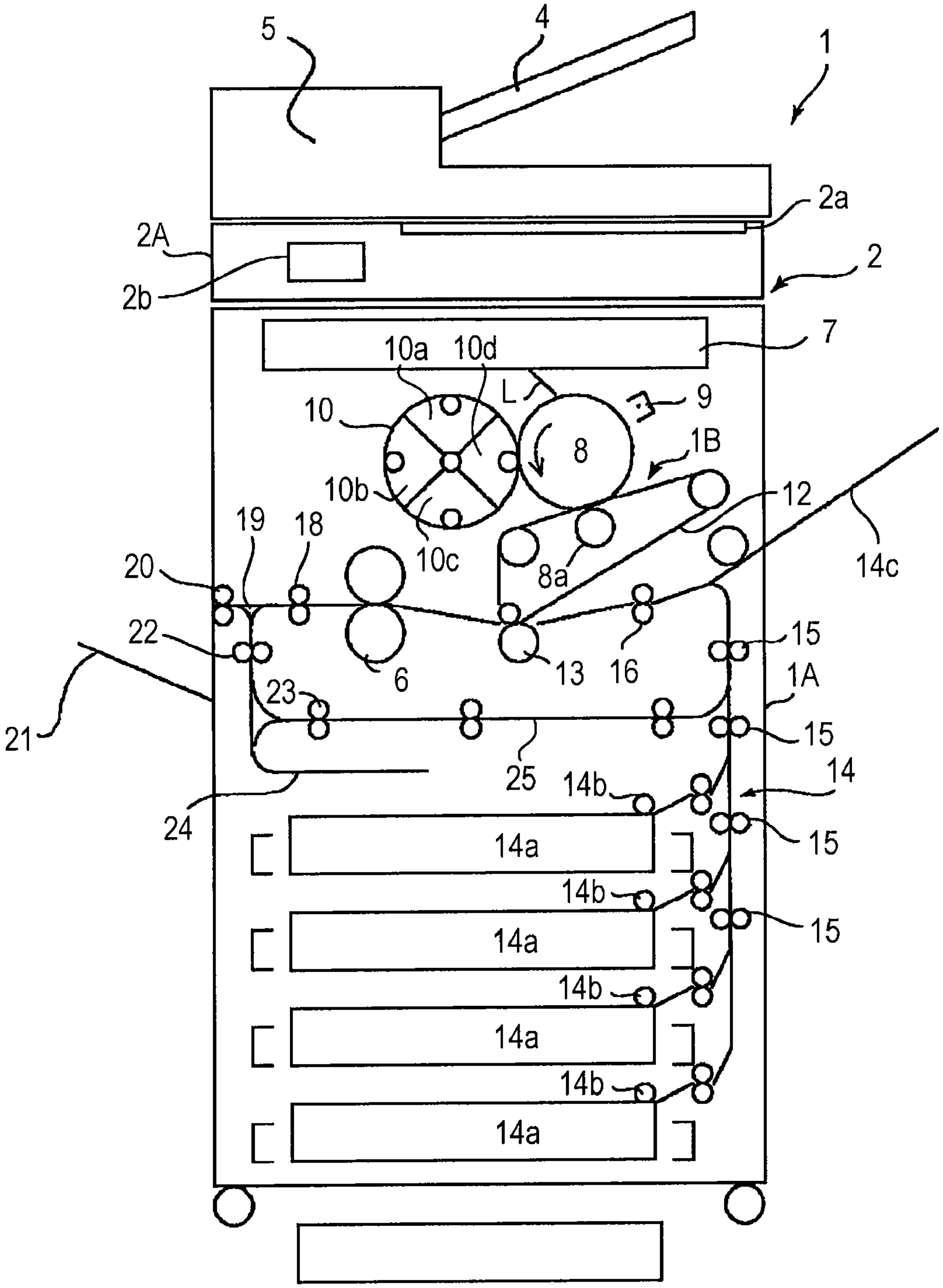
FIG. 2 is a view illustrating the configuration of the image forming apparatus.

FIG. 1 is a perspective view illustrating the outer appearance of an image forming apparatus provided with an image reading apparatus according to an embodiment of the present invention. FIG. 2 is a view illustrating the configuration of the image forming apparatus. In FIGS. 1 and 2, an image forming apparatus 1 capable of forming a color image includes an image forming apparatus body (hereinafter referred to as an apparatus body) 1A.

Above the apparatus body 1A is disposed a scanner 2 serving as an image reading apparatus of a flat bed type having a platen glass 2*a* as an original placing platen mounted thereon. The scanner 2 is provided with an automatic original feeding apparatus (i.e., an ADF) 5 serving as an original conveying apparatus above the same and an image reading unit 2*b* for reading an original placed on the platen glass 2*a* by, for example, the automatic original feeding apparatus 5.

The automatic original feeding apparatus 5 is openably mounted on a scanner body 2A. Moreover, the automatic original feeding apparatus 5 is adapted to press the original placed on the platen glass 2*a* and to automatically feed (i.e., convey) the original to a position at which the image reading unit 2*b* can read an original image, and further, is provided with an original tray 4, on which the original can be placed.

Under the scanner 2 are disposed an image forming unit 1B and a sheet feeding unit 14 for feeding sheets to the image forming unit 1B. In the image forming unit 1B, a photosensitive drum 8 rotating in a direction indicated by an arrow is disposed. Around the photosensitive drum 8, a primary charger 9 and a rotary development device 10 and the like are arranged. The primary charger 9 and the rotary development device 10 incorporate development devices 10*a* to 10*d* therein filled with toners for use in developing an electrostatic latent image formed on the photosensitive drum 8.

In FIG. 2, a writing unit 7 is configured of a laser or a polygon scanner, for irradiating the photosensitive drum 8 with a laser beam L demodulated in response to an image signal subjected to a predetermined image processing, described later.

Here, the photosensitive drum 8 is rotated by a motor, not illustrated, to be electrically charged to a desired potential by the primary charger 9, and then, has an electrostatic latent image formed thereon with the irradiation of the laser beam L from the writing unit 7. Thereafter, the toners contained inside of the development devices 10*a* to 10*d* electrostatically adhere onto the electrostatic latent image by rotating the rotary development device 10, thereby forming a toner image on the photosensitive drum 8.

Additionally, the image forming unit 1B includes an endless transfer belt 12, onto which toner images of four colors formed in sequence on the photosensitive drum 8 are transferred in superimposition, and a secondary transfer roller 13 for transferring, onto a sheet, the toner images transferred onto the transfer belt 12. At a position facing the photosensitive drum 8 via the transfer belt 12, a primary transfer roller 8*a* for primarily transferring the toner images developed on the photosensitive drum 8 onto the transfer belt 12 is located.

The sheet feeding unit 14 is detachably attached to the apparatus body 1A, and is provided with cassettes 14*a* having sheets stored therein, for example, recording sheets or OHP sheets and pickup rollers 14*b* for feeding the sheets stored inside of the cassettes 14*a*. The sheet feeding unit 14 is further provided with a multiple manual sheet feeder 14*c*.

On an upstream side of a secondary transfer unit configured of the transfer belt 12 and the secondary transfer roller 13, registration rollers 16 are disposed. The registration rollers 16 enhance a positional posture accuracy of the sheet and feed the sheets at a good timing in accordance with the toner image formed on the transfer belt. In contrast, on a downstream side of the secondary transfer unit, a fixing unit 6 for fixing an image, which has been transferred onto the sheet by the secondary transfer roller 13 but has not been fixed yet, and discharge rollers 20 for discharging the sheets having the image fixed thereto to the outside of the apparatus body are disposed.

Next, an image forming operation by the image forming apparatus 1 with such configuration is described below.

Upon outputting a sheet feed signal from a control portion, not illustrated, disposed in the apparatus body 1A, the image reading unit 2*b* irradiates the original conveyed to an original image read position on the platen glass 2*a* by the automatic original feeding apparatus 5 with a light beam, and then, reads the original image. Image information read as described above is converted into an electric signal. Thereafter, the writing unit 7 irradiates the photosensitive drum 8 rotating in the direction indicated by the arrow with the laser beam L corresponding to the electric signal. In this way, an electrostatic latent image is formed on the photosensitive drum.

Thereafter, the development device 10*d* for a first color is moved to be brought into contact with the photosensitive drum 8 by rotating the rotary development device 10, so that the toner contained in the development device 10*d* electrostatically adheres onto the electrostatic latent image. In this manner, the electrostatic latent image is developed, and then, the toner image is formed on the photosensitive drum 8. Moreover, the toner image formed on the photosensitive drum 8 is primarily transferred onto the transfer belt 12 by the primary transfer roller 8*a*.

In forming an image of full colors, the toner image of the first color formed on the photosensitive drum 8 is primarily transferred to the transfer belt 12, and further, the rotary development device 10 is rotated, thereby moving to bring the development device 10*a* for a second color into contact with the photosensitive drum 8.

Thereafter, the writing unit 7 irradiates the photosensitive drum 8 with the laser beam L again at a timing at which the tip of the toner image of the first color primarily transferred onto the transfer belt completely accords with the tip of the toner image of the second color formed on the photosensitive drum 8 on the primary transfer roller 8*a*. As a consequence, an electrostatic latent image is formed on the photosensitive drum 8, to be developed by the development device 10*a*, thus forming a toner image.

And then, the toner image of the second color is transferred in superimposition onto the toner image of the first color primarily transferred onto the transfer belt 12. This superimposition is repeated for a third color and a fourth color, so that a toner image of four full colors can be primarily transferred onto the transfer belt 12.

In the meantime, the sheet is fed from the sheet cassette 14*a* by the pickup roller 14*b*. And then, the sheet is conveyed toward the registration rollers 16 by sheet feeding rollers 15. At this time, the registration rollers 16 stay still. The sheet skew feeding is corrected by the registration rollers 16 which stay still.

Thereafter, the registration rollers 16 are driven such that the tip of the toner image on the transfer belt 12 and the sheet tip accord with each other. Consequently, the toner image is transferred onto the sheet by a transfer bias to be applied to the secondary transfer roller 13 in the secondary transfer unit configured of the transfer belt 12 and the secondary transfer roller 13.

That is to say, in the present embodiment, each of the colors of the electrostatic latent image on the photosensitive drum 8 is developed by repeating switch of the development devices 10*a* to 10*d* by the rotation of the rotary development device 10 times of required colors, so that the toner image is primarily transferred onto the intermediate transfer belt 12 every development. After the images of the required colors are superimposed on the intermediate transfer belt 12, which is then conveyed to the secondary transfer unit, so that the toner images are transferred onto the sheet.

Subsequently, the sheet having the toner image transferred thereonto in the above-described manner is conveyed to the fixing unit 6, which pressurizes and heats the sheet, thereby fixing the toner image onto the sheet. Thereafter, the sheet is discharged from the apparatus body 1A to a discharge tray 21 through inner discharge rollers 18 and the discharge rollers 20.

The image forming apparatus 1 includes a straight discharge mode, a reverse discharge mode, and a duplex mode. In the case where the straight discharge mode is selected, the sheet passes a branch 19 toward the discharge rollers 20, and then, is discharged onto the discharge tray 21.

Otherwise, in the case where the reverse discharge mode is selected, the sheet first passes from the branch 19 toward reverse rollers 22 by a switching member, not illustrated. Subsequently, the sheet is conveyed to the discharge rollers 20 with the trailing end thereof oriented toward the tip thereof by the reversal of the reverse rollers 22 when the trailing end has passed the branch 19, to be thus discharged onto the discharge tray 21.

Alternatively, in the case where the duplex mode is selected, the sheet first passes from the branch 19 toward the reverse rollers 22, like in the reverse discharge mode. Next, the sheet passes a branch 23, and then, is switched back at a reverse unit 24, to be then conveyed onto a duplex path 25. And then, an image is formed on the sheet, like at the first side, to be discharged onto the discharge tray 21, like in the straight discharge mode.

Figure 3:
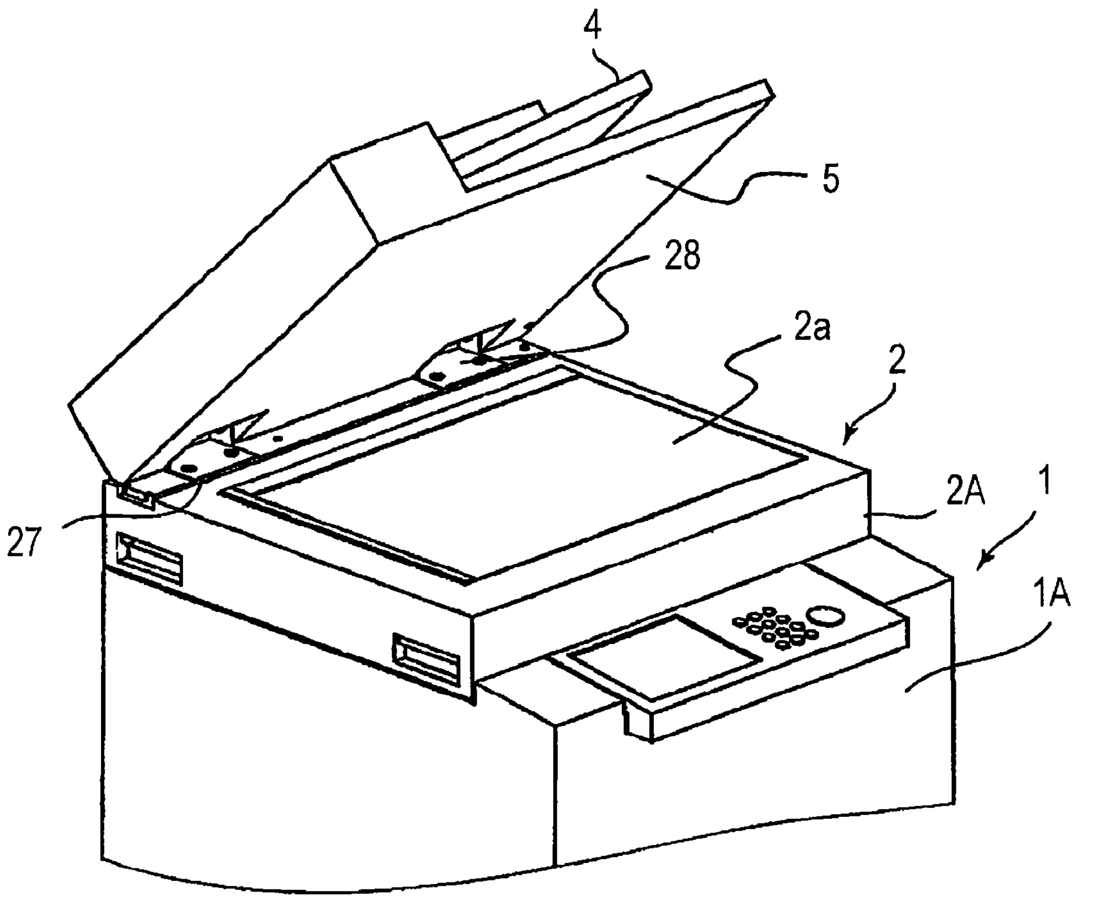
FIG. 3 is a perspective view illustrating an automatic original feeding apparatus in an open state, the automatic original feeding apparatus being openably disposed in a scanner body of a scanner serving as the image reading apparatus.
Figure 4:
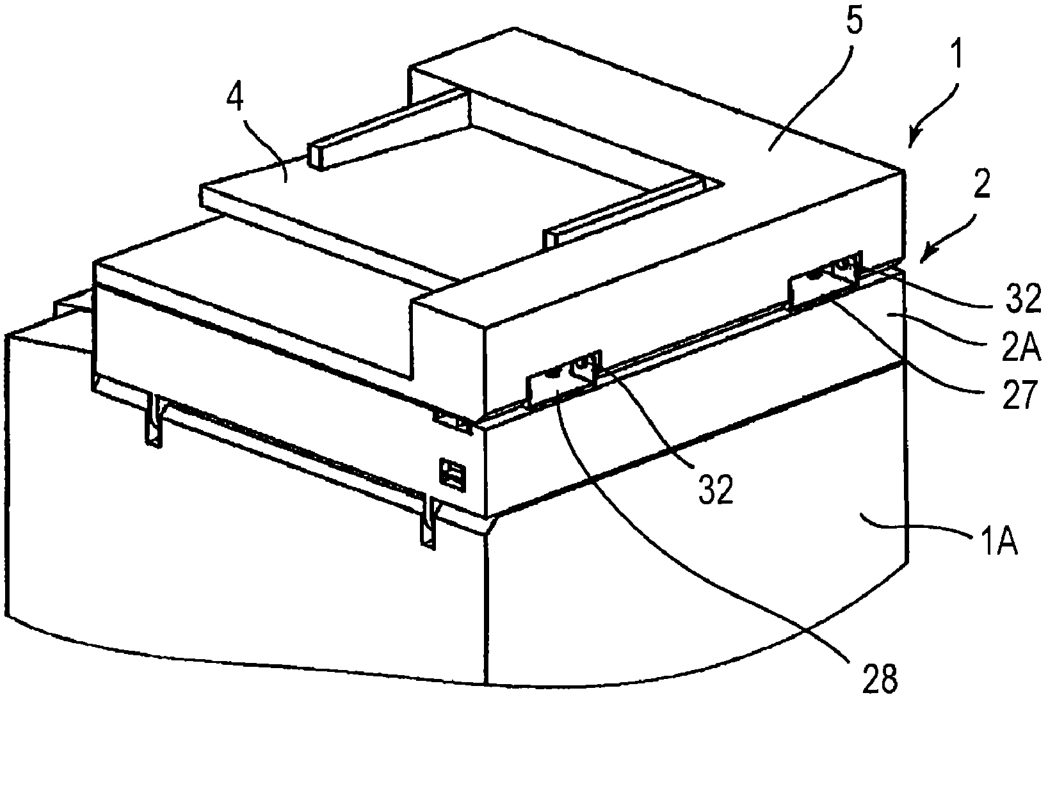
FIG. 4 is a perspective view illustrating a state in which the automatic original feeding apparatus is closed.

The automatic original feeding apparatus 5 is turnably held in the scanner body 2A serving as the apparatus body of the scanner 2 by hinge portions 27 and 28 (a moving mechanism), as illustrated in FIGS. 3 and 4.

Figure 5:
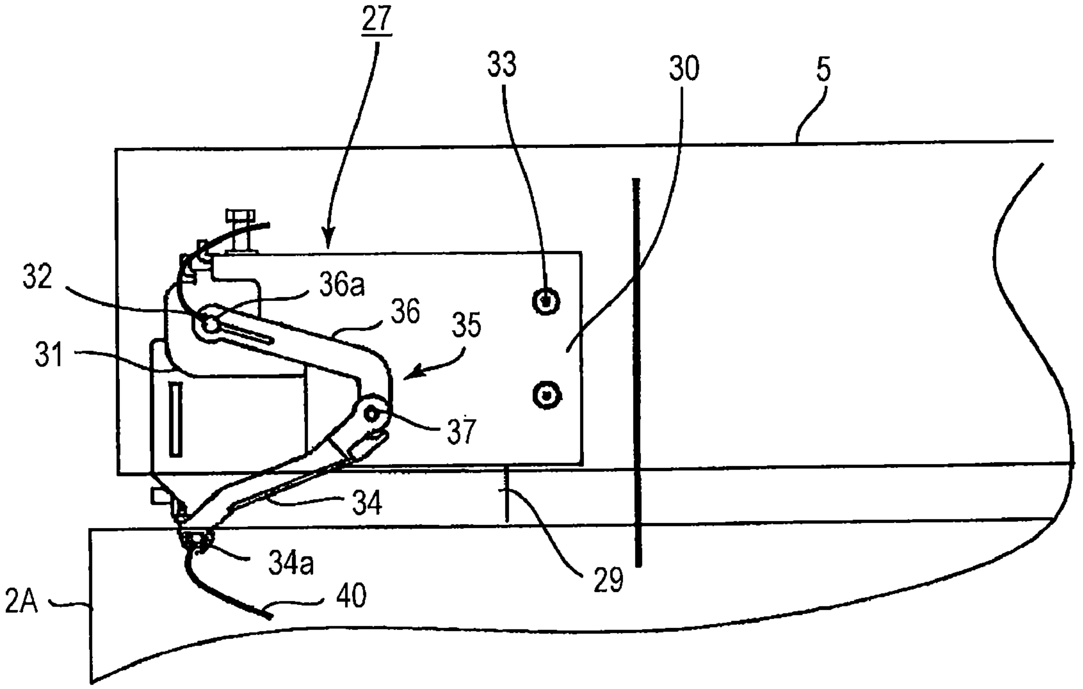
FIG. 5 is a view illustrating the configuration of a hinge portion disposed in the scanner body, for turnably holding the automatic original feeding apparatus.

Here, one hinge portion 27 includes: a base 29 secured to the scanner body 2; a movable part 30 secured in the automatic original feeding apparatus 5 for making the automatic original feeding apparatus 5 turnable; and a relay arm 31 for turnably tightening the base 29 and the movable part 30 to each other, as illustrated in FIG. 5. The relay arm 31 serving as an arm member has one fixed end, and is disposed turnably with respect to the base 29 around a pin 32 as a turn center of the hinge portion 27. The other end (i.e., a turn end) of the relay arm 31 is pivoted by the movable part 30 (i.e., the automatic original feeding apparatus 5) via another pin 33. The other hinge portion 28 has the same configuration.

Figure 6A:
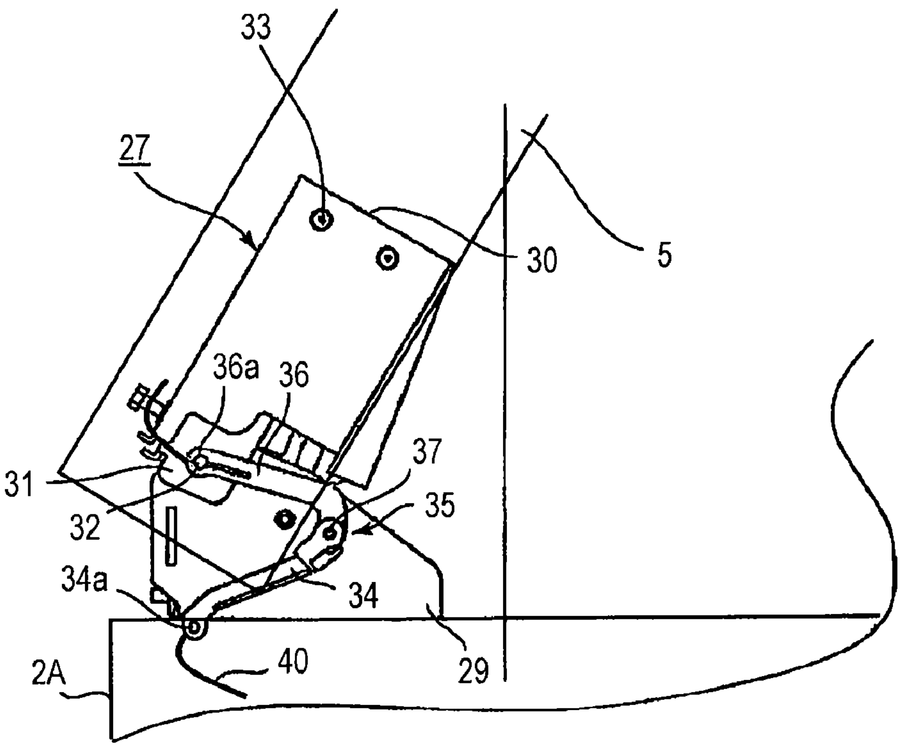
FIGS. 6A and 6B are views illustrating states of the hinge portion when the automatic original feeding apparatus is turned.

FIG. 5 illustrates a first state in which the automatic original feeding apparatus 5 is closed with respect to the scanner body 2A. In contrast, FIG. 6A illustrates a state in which the automatic original feeding apparatus 5 is opened with respect to the scanner body 2A. At this time, the automatic original feeding apparatus 5 is turned around the pin 32 serving as the turn center of the hinge portion 27.

In other words, when the automatic original feeding apparatus 5 is opened, the movable part 30 and the relay arm 31 cannot be moved relatively to each other but the relay arm 31 is turned with the movable part 30 in the integral state, so that the automatic original feeding apparatus 5 is turned counterclockwise with respect to the base 29 around the pin 32 serving as the turn center. Here, a locked portion, not illustrated, to be locked to an upper surface of the relay arm 31 is disposed in, for example, the movable part 30. The automatic original feeding apparatus 5 is turned integrally with the relay arm 31 via the movable part 30 by the locked portion, not illustrated.

Likewise, in the case of a shift from the second state illustrated in FIG. 6A to the state illustrated in FIG. 5, when the movable part 30 and the relay arm 31 are tuned into the relatively immovable and integral state, the automatic original feeding apparatus 5 is turned clockwise with respect to the base 29 around the pin 32.

Figure 6B:
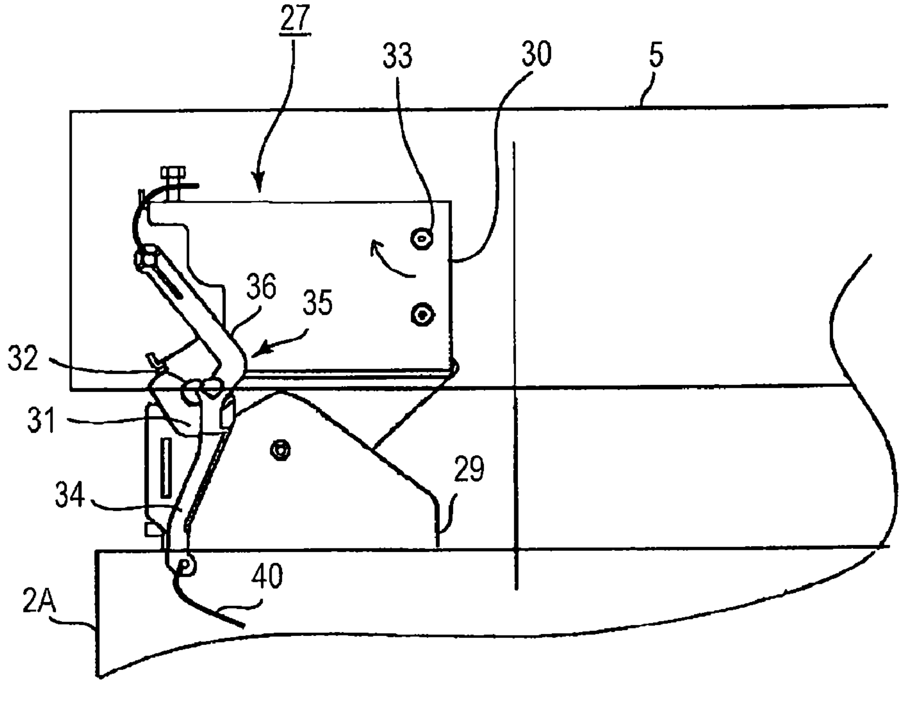
Figure 8A:
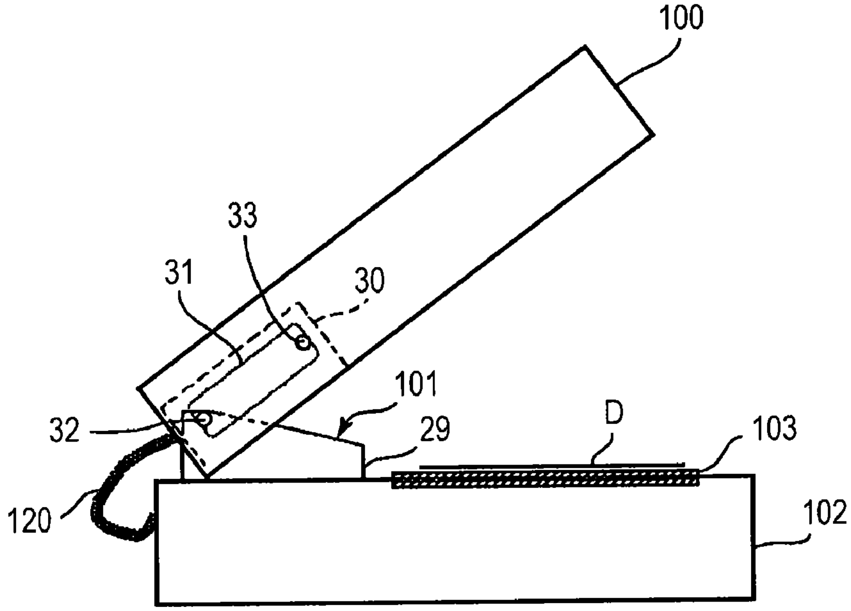
FIGS. 8A, 8B, and 8C are views illustrating the configuration and operation of a hinge portion in the prior art.
Figure 8B:
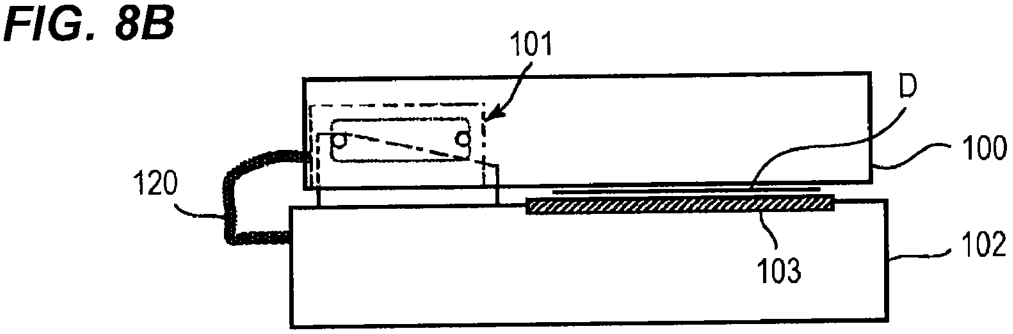
Figure 8C:
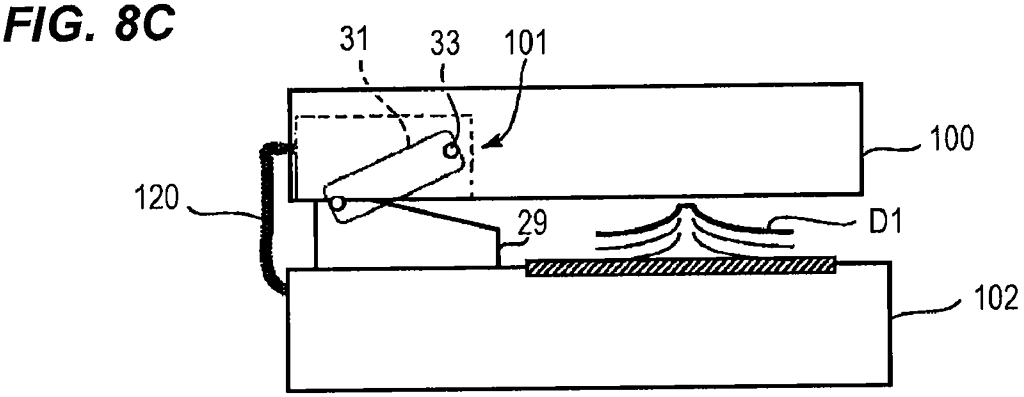

In the meantime, in pressing the thick original such as a book, as illustrated in FIG. 8C, the automatic original feeding apparatus 5 is turned around a turn end from the state illustrated in FIG. 6A to a third state illustrated in FIG. 6B. At this time, in the hinge portion 27, the movable part 30 is turned clockwise in a direction indicated by an arrow around the pin 33 positioned around the turn end side with respect to the relay arm 31 turned counterclockwise. The turn end side is nearer the turn end in relation to the turn center of the hinge portion 27.

When the movable part 30 is turned clockwise with respect to the relay arm 31 in the state in which the relay arm 31 is turned counterclockwise in the above-described manner, the automatic original feeding apparatus 5 is located above at an angle substantially parallel to the scanner body 2A. As a consequence, the automatic original feeding apparatus 5 can uniformly press the thick original.

In FIGS. 5, 6A, and 6B, a cable 40 of, for example, a flat type electrically connects the scanner body 2A serving as a lower unit (a first unit) and the automatic original feeding apparatus 5 serving as an upper unit (a second unit) turnably held in the scanner body 2A via the hinge portions 27 and 28 to each other.

A cable guide 35 having the cable 40 inserted thereinto includes a first guide member 34 and a second guide member 36. The first guide member 34 is formed into a hollow shape so as to allow the cable 40 to be inserted thereinto, and is turnably supported at one end thereof by the scanner body 2A via a pin 34*a*. In the meantime, the second guide member 36 is formed into a hollow shape so as to allow the cable 40 to be inserted thereinto, like the first guide member 34, and is turnably supported at one end thereof by a rib, not illustrated, disposed inside of the movable part 30 in the automatic original feeding apparatus 5 via a pin 36*a*.

Figure 7:
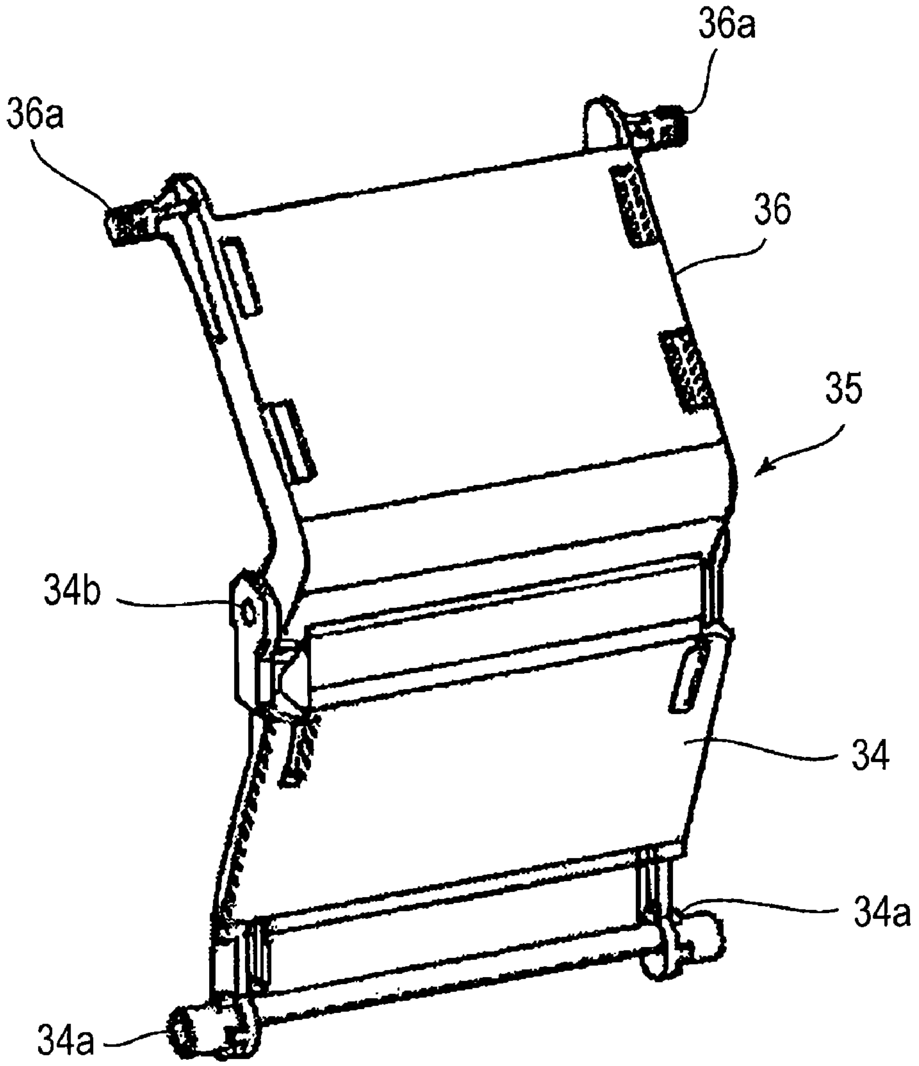
FIG. 7 is a perspective view illustrating the configuration of a cable guide interposed between the scanner body and the automatic original feeding apparatus.

Moreover, a pin 37 is disposed at a turn end of, for example, the second guide member 36, while a engaging hole 34*b* to be engaged around the pin 37 of the second guide member 36 is formed at a turn end of the first guide member 34, as illustrated in FIG. 7. The pin 37 disposed at the turn end of the second guide member 36 is engaged into the engaging hole 34*b* formed at the turn end of the first guide member 34, so that the first guide member 34 and the second guide member 36 can be foldably and extensively connected to each other on the pin 37.

The cable 40 is inserted into the first guide member 34 and the second guide member 36, and further, is connected at one end thereof to a control board, not illustrated, housed inside of the scanner body 2A (or the apparatus body 1A). In contrast, the cable 40 is connected at the other end thereof to a relay board, not illustrated, housed inside of the automatic original feeding apparatus 5.

The first guide member 34 and the second guide member 36 are folded at a node in the first state in which the automatic original feeding apparatus 5 is closed, as illustrated in FIG. 5, and in the second state in which the automatic original feeding apparatus 5 is opened, as illustrated in FIG. 6A. Additionally, the first guide member 34 and the second guide member 36 extend when the second guide member 36 is pulled by the automatic original feeding apparatus 5 in the third state in which the automatic original feeding apparatus 5 is positioned at the angle substantially parallel to and above the scanner body 2A.

In the present embodiment, the pin 36*a* disposed at a fixed end, at which the second guide member 36 is turnably attached with respect to the automatic original feeding apparatus 5, is located coaxially with the pin 32 in such a manner as to accord with the pin 32 serving as the turn center of the hinge portion 27. As a consequence, as illustrated in FIGS. 5 and 6A, in the case where the automatic original feeding apparatus 5 is opened or closed, the first guide member 34 and the second guide member 36 are not moved. Therefore, even if the automatic original feeding apparatus 5 is opened or closed, no stress is exerted on the cable 40 inserted into the cable guide 35.

When the thick original such as a book is pressed, the automatic original feeding apparatus 5 whose state can be changed is shifted from the second state illustrated in FIG. 6A to the third state illustrated in FIG. 6B. At this time, since the automatic original feeding apparatus 5 is relatively separated from the scanner body 2A, the control board housed inside of the scanner and the relay board housed inside of the automatic original feeding apparatus are separated from each other.

In the case where the automatic original feeding apparatus 5 is separated from the scanner body 2A, the first guide member 34 is pulled by the automatic original feeding apparatus 5, so that the first and second guide members 34 and 36 which have been folded up to then extend on the pin 37, as illustrated in FIG. 6B. Here, when the first and second guide members 34 and 36 extend, the cable 40 inserted inside is moved integrally with the first and second guide members 34 and 36.

The cable 40 is designed to be moved integrally with the first and second guide members 34 and 36, and therefore, the cable 40 cannot be caught even if the cable 40 is wired inside of the automatic original feeding apparatus 5 and the scanner body 2A.

As described above, the fixed end of the second guide member 36 is allowed to accord with the pin 32 of the hinge portion 27, so that the first and second guide members 34 and 36 can be folded or extend according to the opening/closing and elevating operations of the automatic original feeding apparatus 5. Moreover, the cable 40 is inserted into the first and second guide members 34 and 36, so that the cable 40 can bend and slide without forming any sag, thereby certainly securing the cable 40 in safety.

In this manner, the cable 40 is inserted into the first and second guide members 34 and 36 which can be folded or extend upon the turn of the automatic original feeding apparatus 5, thereby holding the cable 40 without any damage.

In addition, the cable 40 is inserted into the first and second guide members 34 and 36, so that the cable 40 cannot be exposed to the outside, thereby preventing the outer appearance from being deteriorated. Additionally, since the cable 40 cannot be exposed outside, the cable 40 need not be of a shield type, so that an inexpensive cable such as a flat cable or a fine cable may be used.

Incidentally, in the present embodiment, the first guide member 34 and the second guide member 36 are configured to be folded at the intermediate node thereof. However, a foldable node is not limited to one. For example, tow or more foldable nodes may be formed by interposing an intermediate guide member between the first guide member 34 and the second guide member 36.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-058499, filed Mar. 7, 2008, which is hereby incorporated by reference herein in its entirety.

What is claimed is:

1. An image reading apparatus comprising:

an apparatus body having an image reading unit which reads an original image;

an original conveying apparatus which turns with respect to the apparatus body and conveys an original onto an original image read position in the apparatus body;

a hinge portion which turnably holds the original conveying apparatus on the apparatus body so that (i) the original conveying apparatus is capable of turning around a first turn center from a first state, in which the original conveying apparatus is closed with respect to the apparatus body, to a second state, in which the original conveying apparatus is opened with respect to the apparatus body, and (ii) the original conveying apparatus is capable of turning around a second turn center to a third state, in which the original conveying apparatus is apart from the apparatus body, by moving through the hinge portion;

a cable connecting the apparatus body and the original conveying apparatus to each other;

a cable guide portion which guides the cable, where one end of the cable guide portion is connected to the original conveying apparatus and an other end of the cable guide portion is connected to the apparatus body; and a turning member disposed between the cable guide portion and the original conveying apparatus and turnably supports the one end of the cable guide portion with respect to the original conveying apparatus, wherein when the original conveying apparatus turns from the first state to the second state, a turn axis line of the first turn center, around which the original conveying apparatus turns with respect to the apparatus body, is coincident with a turning axial line of the turning member around which the one end of the cable guide portion turns with respect to the original conveying apparatus.

2. An image reading apparatus according to claim 1, wherein the guide portion has a first guide member that is turnably attached to the apparatus body on one end of the first guide member, and a second guide member that is turnably attached to the original conveying apparatus via the turning member on one end of the second guide member, and wherein the first guide member and the second guide member are pivotably connected to each other on other ends of the first guide member and the second guide member.

3. An image reading apparatus according to claim 2, wherein when the conveying apparatus changes from the second state to the third state, the first guide member is turned with respect to the second guide member.

4. An image reading apparatus according to claim 1, wherein the hinge portion comprises a first hinge and a second hinge, each including (i) a first pin, which forms the first turn center, and (ii) a second pin, which forms the second turn center.

5. An apparatus comprising:

a first unit;

a second unit which turns with respect to the first;

a hinge portion which turnably holds the second unit on the first unit so that (i) the second unit is capable of turning around a first turn center from a first state, in which the second unit is closed with respect to the first unit, to a second state, in which the second unit is opened with respect to the first unit, and (ii) the second unit is capable of turning around a second turn center to a third state, in which the second unit is apart from the first unit, by moving through the hinge portion;

a cable connecting the first unit and the second unit to each other;

a cable guide portion which guides the cable, where one end of the cable guide portion is connected to the second unit and an other end of the cable guide portion is connected to the first unit; and a turning member disposed between the cable guide portion and the second unit and turnably supports the one end of the cable guide portion with respect to the second unit, wherein when the second unit turns from the first state to the second state, a turn axis line of the first turn center, around which the second unit turns with respect to the first unit, is coincident with a turning axial line of the turning member around which the one end of the cable guide portion turns with respect to the second unit.

6. An apparatus according to claim 5, wherein the guide portion has a first guide member that is turnably attached to the first unit on one end of the first guide member, and a second guide member that is turnably attached to the second unit via the turning member on one end of the second guide member, and wherein the first guide member and the second guide member are pivotably connected to each other on other ends of the first guide member and the second guide member.

7. An apparatus according to claim 6, wherein when the second unit changes from the second state to the third state, the first guide member is turned with respect to the second guide member.

8. An apparatus according to claim 5, wherein the hinge portion comprises a first hinge and a second hinge, each including (i) a first pin, which forms the first turn center, and (ii) a second pin, which forms the second turn center.

9. A cabling apparatus comprising:

a cable connecting a first unit and a second unit which turns with respect to the first unit;

a hinge portion which turnably holds the second unit on the first unit so that (i) the second unit is capable of turning around a first turn center from a first state, in which the second unit is closed with respect to the first unit, to a second state, in which the second unit is opened with respect to the first unit, and (ii) the second unit is capable of turning around a second turn center to a third state, in which the second unit is apart from the first unit, by moving through the hinge portion;

a cable guide portion which guides the cable, where one end of the cable guide portion is connected to the second unit and an other end of the cable guide portion is connected to the first unit; and a turning member disposed between the cable guide portion and the second unit and turnably supports the one end of the cable guide portion with respect to the second unit, wherein when the second unit turns from the first state to the second state, a turn axis line of the first turn center around which the second unit turns with respect to the first unit, is coincident with a turning axial line of the turning member around which the one end of the cable guide portion turns with respect to the second unit.

10. A cabling apparatus according to claim 9, wherein the guide portion has a first guide member that is turnably attached to the first unit on one end of the first guide member, and a second guide member that is turnably attached to the second unit via the turning member on one end of the second guide member, and wherein the first guide member and the second guide member are pivotably connected to each other on other ends of the first guide member and the second guide member.

11. The cabling apparatus according to claim 10, wherein the second unit can move away from the first unit by a moving mechanism, and wherein the second unit is capable of being brought into (i) the first state in which the second unit is closed with respect to the first unit (ii) the second state in which the second unit is opened with respect to the first unit by turning around the turning axial line of the hinge portion, and (iii) the third state in which the second unit is apart from the first unit by moving through the moving mechanism, and wherein when the second unit changes from the second state to the third state, the first guide member is turned with respect to the second guide member.

12. A cabling apparatus according to claim 9, wherein the hinge portion comprises a first hinge and a second hinge, each including (i) a first pin, which forms the first turn center, and (ii) a second pin, which forms the second turn center.

* * * * *